UNITED STATES PATENT OFFICE.

ANTON HLAWITSCHKA AND GUSTAV DRUCKER, OF VIENNA, AUSTRIA-HUNGARY.

PROCESS OF PREPARING FOOD FOR ANIMALS.

SPECIFICATION forming part of Letters Patent No. 675,656, dated June 4, 1901.

Application filed March 5, 1900. Serial No. 7,269. (No specimens.)

*To all whom it may concern:*

Be it known that we, ANTON HLAWITSCHKA and GUSTAV DRUCKER, both subjects of the Emperor of Austria-Hungary, residing at Vienna, in the Empire of Austria-Hungary, have invented certain new and useful Improvements in Processes of Producing Food for Animals from Blood, Sugar, and Digestible Vegetable Substances, (for which we have applied for patents in France, dated February 10, 1900; in Italy, dated February 6, 1900, and in England, No. 2,527, dated February 8, 1900,) of which the following is a specification.

This invention is a process of manufacturing a food for animals, the object being to provide a palatable food of a nutritious character which will not deteriorate when kept for any length of time.

The materials used for our improved food consist of blood, sugar, and some fibrous material acting as a vehicle. We also utilize at times special nutritious substances in addition to those named. Various attempts have been made heretofore to prepare a food from these materials; but the result has not been satisfactory, owing to the difficulty of preserving the blood and of relieving it of its nauseous taste. It has also been difficult to obtain a food containing these materials in a fit mechanical condition, so that animals usually have rejected it.

Our improved process in general consists in first rendering the blood aseptic in the manner hereinafter described, then allowing it to become absorbed into the cells of a fibrous material, and then reducing the substance to a granular state and producing upon it a glaze to prevent the fibers and blood from being attacked by bacteria or germs of putrefaction. This glaze is obtained by heating the sugar which is naturally contained in the mass or which is specially added thereto, such sugar also imparting an agreeable taste and highly-nutritive properties, besides increasing the digestibility of the product.

The steps of our improved process in detail are as follows: A solution of alcohol of forty or fifty per cent. is saturated with common salt, from eight to eleven parts of salt being required when spirit of wine is used. Fresh blood is then treated by adding to it small quantities of this alcoholic salt solution, the quantity of solution added depending upon the time which it is desired to keep the product, from one to six per cent. of the solution being sufficient. This treatment of the blood absolutely prevents putrefaction and decomposition, and it is the important feature of our invention. Next a quantity of fibrous substances—such, for instance, as bran, vegetable roots, or brewers' residues or dregs—is added to the treated blood, and if such fibrous substances are not of such character as to afford a quantity of sugar then sugar in the form of molasses, raw sugar, or other cheap state is added. For instance, if bran is used one part of molasses or sugar should be mixed with five parts of bran, similar proportions being used with other materials. Beets and such sugar-producing roots require very little, if any, sugar. As to the proportion of the blood and fibrous substances, it may be stated that one and one-half parts of blood to one part of the fibrous substance will prove very satisfactory. When these substances are mixed, the blood impregnates the fibrous substances and occupies the cells therein. The mass is then gradually heated to the temperature of 100° centigrade and is at the same time converted into a granular form. The heat melts the sugar or draws it to the surface of the granules and imparts a glaze, which after hardening acts as a shield to protect and preserve the compound of blood and fiber, preventing the access thereto of the germs of putrefaction or the bacteria or microbes of disease.

As a special preventive against the coagulation of the blood it may be treated with ammonia when undergoing its treatment with the salt solution. For this purpose one-third ammonia to two-thirds of the solution will suffice.

Other materials may be added to the product for the purpose of increasing the nourishing value—such, for instance, as calcium phosphate—and if ammonia has been used in the preservation of the blood phosphoric acid is then added to the blood and calcium hydrate to the fibrous material.

Having described our invention, we claim—

1. The process of manufacturing a food for animals which consists in first treating the blood with a solution of common salt and alcohol, then impregnating a mass of fibrous material with the treated blood, then gradually heating the mass and applying sugar, for the purpose set forth.

2. The process of manufacturing a food for animals which consists in first treating the blood with a solution of common salt and alcohol, then impregnating a mass of fibrous material with the treated blood, then gradually heating the mass and applying sugar and reducing the mass to a granular state.

3. The process of manufacturing a food for animals which consists in adding to fresh blood, from one to six per cent. of common salt and alcohol, then mixing one and one-half portions of the blood with one portion of fibrous material, and allowing the blood to become absorbed by the fibrous material, then adding a quantity of sugar depending upon the amount of sugar already contained in the fibrous mass, then gradually heating the mass to the temperature of 100° centigrade and reducing it to a granular state.

In testimony whereof we have hereunto set our hands in the presence of two witnesses.

ANTON HLAWITSCHKA.
GUSTAV DRUCKER.

Witnesses:
  ALVESTO S. HOGUE,
  AUGUST FUGGER.